United States Patent [19]

Hirota

[11] 3,987,352

[45] Oct. 19, 1976

[54] METHOD OF CHARGING STORAGE BATTERY IN POWER SUPPLY SYSTEM HAVING ANOTHER BATTERY OF LARGER CAPACITY

[75] Inventor: Toshio Hirota, Yokohama, Japan

[73] Assignee: Nissan Motor Co., Ltd., Japan

[22] Filed: May 30, 1975

[21] Appl. No.: 582,385

[30] Foreign Application Priority Data

June 10, 1974 Japan.............................. 49-65028

[52] U.S. Cl........................................ 320/3; 320/6; 320/19; 320/39
[51] Int. Cl.² ........................................ H02J 7/00
[58] Field of Search........................ 320/3, 4, 5–15, 320/21, 61, 32, 39, 40, 19

[56] References Cited
UNITED STATES PATENTS

| | | | |
|---|---|---|---|
| 2,818,543 | 12/1957 | Dodge..................................... | 320/3 |
| 3,489,915 | 1/1970 | Engelhardt........................ | 320/15 X |
| 3,683,258 | 8/1972 | Harbonn.............................. | 320/8 X |
| 3,821,626 | 6/1974 | Maver et al............................. | 320/3 |

Primary Examiner—J. D. Miller
Assistant Examiner—Robert J. Hickey
Attorney, Agent, or Firm—Robert E. Burns; Emmanuel J. Lobato; Bruce L. Adams

[57] ABSTRACT

In a power supply system constituted of a relatively high output and small capacity first battery such as a lead or alkaline storage battery and a lower output and larger capacity second battery such as a fuel cell, a portion of the discharge current of the second battery is utilized for charging the first battery, while the system is delivering a fluctuating load current under the control of a chopper, by controlling the flow of the charging current through a second chopper circuit such that the charging current is continuously furnished to the first battery when its residual capacity decreases to a predetermined value, but is interrupted periodically when the residual capacity reaches a predetermined upper limit so as to compensate slightly insufficiently for discharged energy in each cycle of the load current controlling chopper actions, resulting in gradual drop of the residual capacity to the former predetermined value and recurrence of the continuous charging.

4 Claims, 6 Drawing Figures

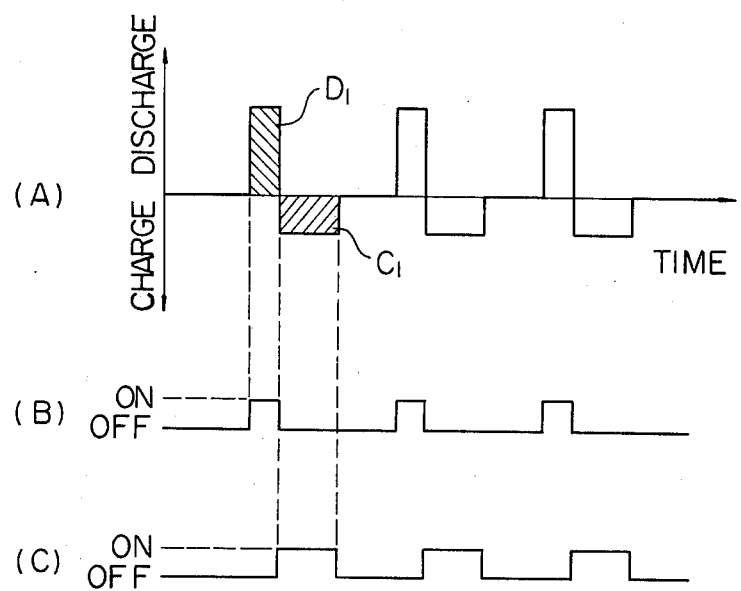

METHOD OF CHARGING STORAGE BATTERY IN POWER SUPPLY SYSTEM HAVING ANOTHER BATTERY OF LARGER CAPACITY

This invention relates generally to a power supply system made up of two different types of batteries, one of which has a larger capacity and the other a greater output, and more particularly to a method of charging the latter battery of such a system by the application of a discharge current of the former battery during operation of the system.

When a group of batteries are employed as a power supply system for a load which needs a greatly variable load current continuously for a long period of time as typified by an electric automobile or a submarine, the power supply system is usually made up of two different types of batteries.

The first of these two types of batteries is characterized by its large capacity. It can be discharged continuously for a quite long period of time, but its output is limited to a relatively low level. In other words, this battery can be discharged only at moderate or low discharge currents. A battery of this type may be called an "energy battery" (hereinafter will be referred to as E-battery) and is exemplified by a fuel cell, an air-zinc cell battery and a nuclear battery. The other battery, on the contrary, is characterized by its great maximum output or ability of delivering relatively high currents compared with the E-battery, but it cannot be discharged continuously for so long a period of time as the E-battery even at a moderate discharge current. This type of battery may be called "power battery" (hereinafter referred to as P-battery) and is exemplified by a lead storage battery and an alkaline storage battery such as a nickel-cadmium battery. A capacitor can be regarded as an analogous power supply to the P-battery.

In a power supply system made up of these two types of batteries, the E-battery and P-battery are connected in parallel with each other and the former is constructed to have a higher open circuit voltage than the latter, so that exclusively the former furnishes an output current under relatively light load conditions. The terminal voltage of the E-battery usually decreases as the discharge current is increased, while the P-battery exhibits little decrease in the terminal voltage even if it is discharged at considerably high discharge currents. When the load becomes heavier and the terminal voltage of the E-battery in this power supply system drops to the same level as the open-circuit voltage of the P-battery, the P-battery begins to share in furnishing an increased output current. It is a usual practice for this type of power supply system to charge the P-battery by the use of a portion of the discharge current of the E-battery. An arrangement of a conventional power supply system as well as some problems in connection with charging of the P-battery will be briefly described with reference to a part of Figures in the accompanying drawings.

In the drawings:

FIG. 6 is a chart showing an example of charge and discharge modes of the P-battery in the system of FIG. 4 resulting from operations of the control circuits in the same system and the load current control circuit.

Figure 1:
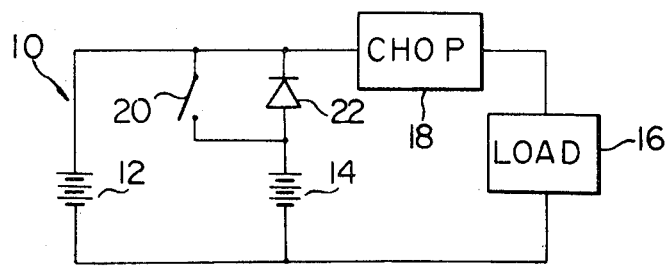
FIG. 1 is a circuit diagram of a conventional power supply system having an E-battery and a P-battery, which system is associated with a load via a load current control circuit.

Referring to FIG. 1, a conventional power supply system 10 which has an E-battery 12 and a P-battery 14 in parallel connection is associated with a load 16 via an interposed chopper circuit 18 for controlling the load current. A switch 20 and a diode 22 are inserted in parallel with each other between the E-battery 12 and the P-battery 14 for charging tne P-battery 14 by applying a charging current from the E-battery 12.

Figure 2:
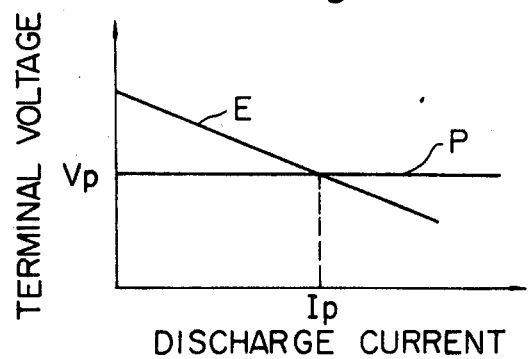
FIG. 2 is an explanatory graph showing discharge characteristics of the respective batteries in the system of FIG. 1.

When the load 16 is relatively light and the switch 20 is kept closed, the discharge current of the E-battery 12 serves as both a load current to the load 16 and charging current for the P-battery 14 at the same time. The switch 20 is of such a type that it turns automatically off when the P-battery 14 is fully charged and prevents overcharge, and thereafter the discharge current of the E-battery 12 is applied exclusively to the load 16. If the discharge current of the E-battery 12 increases gradually due to fluctuation of the load 16, the terminal voltage of the E-battery 12 lowers gradually and reaches the open-circuit voltage $V_p$ of the P-battery 14 at a discharge current of $I_p$ as shown in the graph of FIG. 2, wherein two lines E and P represent discharge characteristics of the E-battery 12 and P-battery 14, respectively. When the magnitude of the load current for the load 16 is equal to $I_p$, the load current is delivered exclusively from the E-battery 12, and the P-battery 14 is neither charged nor discharged. As the load 16 becomes heavier the P-battery 14 begins discharging so that the load current which is now higher than $I_p$ is supplied from both the E-battery 12 and P-battery 14 in collaboration.

In principle, the maxiumum discharge current of the E-battery 12 in the circuit of FIG. 1 agrees with the above-defined critical current $I_p$. When, however, the load current is controlled by means of a chopper circuit 18 as is usual with many practical applications of the power supply system 10, the P-battery 14 is discharged to a certain extent for the following reason even if a required magnitude of the load current is below $I_p$. Since the load current is under the control of the chopper circuit 18, the discharge current of the power supply system 10 and the load current applied to the load 16 are not strictly of the same value. Actually the discharge current is expressed as a mean value of momentary values in a unit time and the load current is decreased from this mean value in proportion to the current flow ratio of the chopper circuit 18. Accordingly, the momentary values of the discharge current must be higher than $I_p$ when the load current is caused to increase up to $I_p$. It follows that not only the E-battery 12 but also the P-battery 14 is discharged even though the load current is still below the critical current $I_p$.

Figure 3:
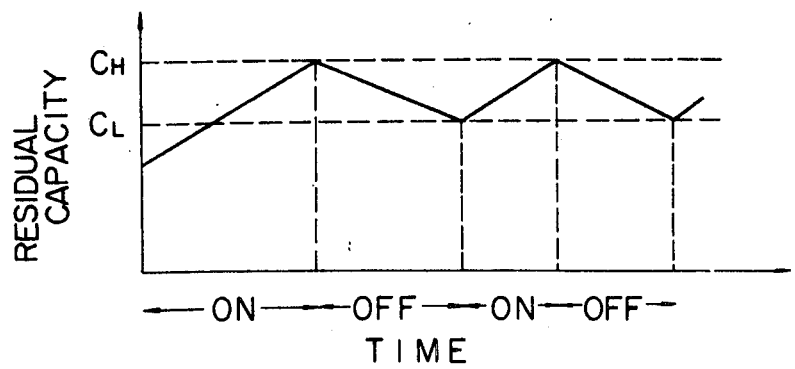
FIG. 3 is an explanatory graph showing the variation in the residual capacity of the P-battery in the system of FIG. 1 with respect to the operation of a charging switch in the same system.

The switch 20 for preventing overcharge of the P-battery 14 is controlled such that the switch 20 turns off when the terminal voltage or the residual capacity of the P-battery 14 reaches a predetermined value $C_H$, which will be called a charge stop value, and turns on when the residual capacity decreases to another predetermined value $C_L$ which will be called a charge start value. Thus the P-battery 14 is discharged accompanied with no charging while the load current is above a certain level and the switch 20 remains off, resulting in a rapid decrease in its residual capacity. Therefore, the P-battery 14 in the power supply system 10 is subjected to frequently repeated cycles of charging and discharging as illustrated in FIG. 3.

To summarize, a relatively large amount of the discharge current of the E-battery 12 in this system 10 is not directly supplied to the load 16 but through the P-battery 14. Such a detouring current flow causes reduction in the total efficiency of the system 10 by a degree corresponding to a total energy loss in the repeated charging of the P-battery 14. Besides, deterioration of the P-battery 14 is accelerated when charge and discharge are cycled too frequently.

A practically available capacity of the P-battery 14 is expressed by the difference between the mean value of the aforementioned charge stop and start values $C_H$ and $C_L$, $(C_H + C_L)/2$, and a minimum residual capacity $C_R$ which is determined on the basis of various factors such as current rating, efficiency and life of the battery. If the entire capacity of the P-battery 14 is represented by a symbol C and the values $C_H$, $C_L$ and $C_R$ are assumed to be 80%, 60%, and 30% of C, respectively, the practically available capacity is obtained by the computation $$C \times ( \frac{0.8 + 0.6}{2} - 0.3 ) = 0.4 \, C.$$

The result of this computation means that only 40% of the entire capacity can be utilized effectively in this case. The practically available capacity is desired to be as large as possible since a maximum discharging time for the P-battery 14 at a relatively high discharge rate is governed by this capacity value. Superficially, the available capacity can be increased by increasing the mean value $(C_H + C_L)/2$. In reality, it is quite difficult to bring the value $C_H$ close to the entire capacity due to difficulty in the measurement thereof and fear of causing overcharging. If, on the other hand, the value $C_L$ is increased so as to get near $C_H$, charging and discharging of the P-battery 14 are cycled more frequently and result in a significantly rapid deterioration of the P-battery 14.

It is therefore an object of the present invention to provide a method of charging the P-battery in a power supply system of the described type, which method can minimize the disadvantages involved in conventional charging methods for the same battery and contributes to increase a practically available capacity of the same battery.

It is another object of the invention to provide an improved power supply system which is fundamentally of the described type but has a charging circuit for performing a charging method according to the invention.

A method according to the invention is for charging a first battery of a power supply system having a second battery in parallel connection with the first battery, which second battery is higher in open-circuit voltage and larger in capacity but lower in maximum output than the first battery. The method comprises the steps of: (a) interrupting periodically an output current of the power supply system thereby to control the magnitude of a load current applied to a separate load; (b) applying a charging current from the second battery to the first battery continuously when residual capacity of the first battery decreases to a first predetermined value; and (c) interrupting periodically the charging current in a controlled manner such that the amount of energy charged to the first battery in each cycle of the charging current interruption is close to but less than the amount of energy discharged from the first battery in each preceding cycle of the cycle of the output current interruption when the residual capacity of the first battery increases to a second predetermined value by the step (b), which step (c) is carried out until the residual capacity again decreases to the first predetermined value.

A power supply system according to the invention for applying an output current to a separate load via a first chopper comprises: the above described first and second batteries connected in parallel with each other; a charging circuit for applying a charging current from the second battery to the first battery; a second chopper circuit arranged in the charging circuit; and a control circuit for controlling the operation of the second chopper circuit such that the second chopper circuit permits the charging current to flow therethrough either continuously or with periodical interruption in accordance with the above described method of the invention.

The invention will be fully understood from the following detailed description of preferred embodiments thereof with reference to the accompanying drawings.

In principle, the above defined first battery, i.e. a P-battery, is subjected solely to static charge and discharge without involving electrochemical reactions in its cells when operated under relatively light load conditions according to a method of the invention.

Either a lead storage battery or an alkaline storage battery which is utilized in most cases as a practical P-battery for the power supply system herein concerned with has a large electrostatic capacitance. If, therefore, such a battery is subjected to recurring cycles of charging and discharging with a comparatively high frequency, e.g. 50 Hz or higher, there occur substantially no electrochemical charge and discharge but almost only electrostatic ones. When the battery is subjected solely to static charge and discharge, the energy utilization efficiency is near to 100% and the life of the battery is little affected by the operation. The static charge and discharge for the P-battery in the described power supply system may be realized when the output current of the power supply system is controlled by means of a chopper circuit if the P-battery is charged every time the chopper circuit permits the current to pass therethrough by the same amount of energy as discharged at that time.

Figure 4:
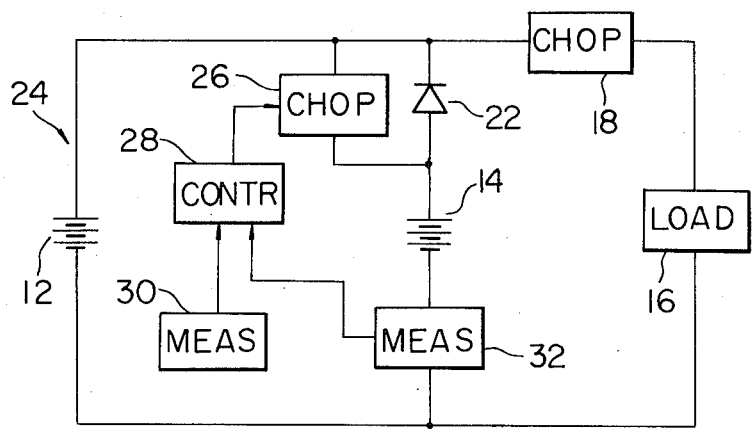
FIG. 4 is a block diagram of a power supply system in accordance with the invention, which system has a group of control circuits in place of the charging switch of FIG. 1.

FIG. 4 shows a power supply system 24 which is fundamentally similar to the system 10 of FIG. 1 but has a charging circuit according to the invention in place of the charging switch 20 in the conventional system 10. This power supply system 24 has a chopper circuit 26 and the diode 22 in parallel connection, through which the P-battery 14 is charged and discharged, respectively. To control the operation of this chopper circuit 26, the system 24 further involves a control circuit 28, an energy capacity measuring circuit 30 which measures the amount of the residual capacity of the P-battery 14 and supplies an output signal representing the measured capacity to the control circuit 28, and a current measuring circuit 32 which measures the intensity of the charging and discharging currents flowing into and from the P-battery 14 and furnishes an output signal representing the measured current to the control circuit 28. This system 24 is associated with the fluctuating load 16 via the chopper circuit 18 for the control of the load current similarly to the case of FIG. 1.

Figure 5:
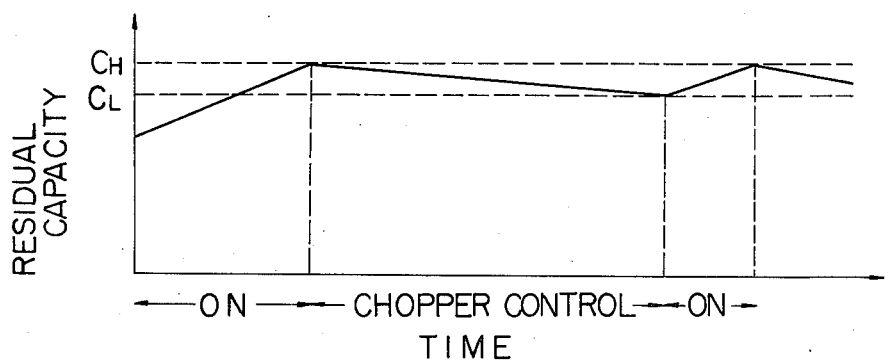
FIG. 5 is an explanatory graph showing the same relationship as the graph of FIG. 3 for the system of FIG. 4.

According to the invention, the P-battery 14 is charged by the use of the discharge current of the E-battery 12 while the power supply system 24 supplies power to the load 16 in the following manners. If the P-battery 14 is discharged to some extent and its residual capacity decreases below a predetermined charge start value $C_L$, the control circuit 28 causes the chopper circuit 26 to make no periodic interruption but to remain continuously in the "on" state based on the outputs of the capacity measuring circuit 30 and the current measuring circuit 32. In other words, the current flow ratio of the chopper circuit 26 is kept at 100%. Accordingly, the P-battery 14 is charged and the residual capacity increases as shown in the explanatory graph of FIG. 5 at the extreme left side region. When the residual capacity increases up to another predetermined value, i.e. charge stop value $C_H$, the control unit 28 causes the chopper circuit 26 to commence a choppering action or a periodic interruption of the charging current from the E-battery 12. In this instance, the chopper circuit 26 is controlled in correlation to the operation of the other chopper circuit 18 for the load current such that the former chopper 26 performs periodical interrution with the same frequency as the latter chopper circuit 18 and that the amount of energy charged to the P-battery 14 in a single cycle of the charging current flow interruption and permission actions of the chopper 26 is nearly equal to the amount of energy discharged from the P-battery 14 in a preceding single cycle of the periodical functions of the chopper 18. FIG. 6 shows a time chart as an example of such chopper control patterns, wherein the uppermost graph (A) represents the charging and discharging currents for the P-battery 14 while the lines (B) and (C) represent the on-off modes of the chopper 18 for the load current and the chopper 26 for the charging current, respectively. In the graph (A), the hatched area $C_1$ represents the amount of charged energy in a cycle of (C) and nearly equals to another hatched area $D_1$ which represents the amount of energy discharged in a preceding cycle of (B). It is, however, practically impossible to control the chopper 26 such that the area $C_1$ is in strict agreement with the area $D_1$. The chopper 26 is controlled such that the amount of energy charged in each cycle is slightly insufficient to compensate for the discharged energy in a preceding discharge cycle because the P-battery 14 may be overcharged if the amount of the charged energy or the area $C_1$ exceeds the amount of the discharged energy or the area $D_1$. Accordingly, the residual capacity of the P-battery 14 decreases gradually while the thus controlled pulse-wise discharge and charge cycles are repeated in the period indicated in FIG. 5 as "chopper control". The rate of decrease is, however, extremely slower than in the case when the charging switch 20 of FIG. 1 remains off. The chopper 26 stops the choppering function and turns into the continuously "on" state when the residual capacity decreases to the value $C_L$, and the P-battery 14 can be rapidly charged to the level of the value $C_H$ as seen in FIG. 5. It will be understood that the value of the residual capacity may drop below the level of $C_L$ when the system 24 is operated under comparatively heavy load conditions.

The individual circuits 26, 28, 30 and 32 having the described functions are quite familiar at present and will need no detailed explanation.

As seen from the above description and comparison between FIGS. 3 and 5, a charging method according to the invention can prevent the residual capacity of the P-battery 14 from decreasing noticeably at relatively low discharge currents and decrease the number of repetition times of electrochemical charging and discharging. Besides, the residual capacity value $C_L$ at which the charging occurs can be made larger, and hence the difference between $C_L$ and the upper limit value $C_H$ can be made smaller, than the values employable in conventional charging methods without increasing the number of repetition times of charge and discharge cycles.

Consequently, a charging method according to the invention brings about a noticeable increase in the practically available capacity and extension of the life with respect to the P-battery 14 together with improvement on the total efficiency of the power supply system made up of the P-battery 14 and the E-battery 12.

What is claimed is:

1. A method of charging a first battery of a power supply system having a second battery connected in parallel with the first battery, the second battery being higher in open-circuit voltage and larger in capacity but lower in maximum output than the first battery; the method comprising the steps of:
    a. interruping periodically an output current of the power supply system thereby to control the magnitude of a load current applied to a separate load;
    b. applying a charging current from the second battery to the first battery continuously when residual capacity of the first battery decreases to a first predetermined value; and
    c. interrupting periodically the charging current in a controlled manner such that the amount of energy charged to the first battery in each cycle of the charging current interruption is close to but less than the amount of energy discharged from the first battery in each preceding cycle of the output current interruption when the residual capacity of the first battery increases to a second predetermined value by the step (b), the step (c) being carried out until the residual capacity decreases to the first predetermined value.

2. A method as claimed in claim 1, wherein said steps (a) and (c) are carried out with the same frequency.

3. A power supply system for applying an output current to a separate load, the load current to the load being under the control of a first chopper circuit, the system comprising:
    a first battery;
    a second battery connected in parallel with the first battery, the second battery being higher in open-circuit voltage and larger in capacity but lower in maximum output than the first battery;

a charging circuit for applying a charging current from the second battery to the first battery;

a second chopper circuit arranged in the charging circuit; and means for controlling the operation of the second chopper circuit such that the second chopper circuit permits the charging current to flow therethrough continuously and without interruption when residual capacity of the first battery decreases to a first predetermined value, but periodically interrupts the charging current when the residual capacity increases to a second predetermined value, the interruption of the charging current being in such a manner that the amount of energy charged to the first battery in each cycle of interruption actions is close to but less than the amount of energy discharged from the first battery in each cycle of interruption actions of the first chopper circuits, thereby to allow the residual capacity to decrease gradually to the first predetermined value.

4. A power supply system as claimed in claim 3, wherein the control means are arranged such that the operation of the second chopper circuit is controlled based on actual values of the residual capacity and discharge current of the first battery.

\* \* \* \* \*